Apr. 24, 1923.
S. L. TERRY
LOCK
Filed Feb. 1, 1919    2 Sheets-Sheet 1
1,453,115
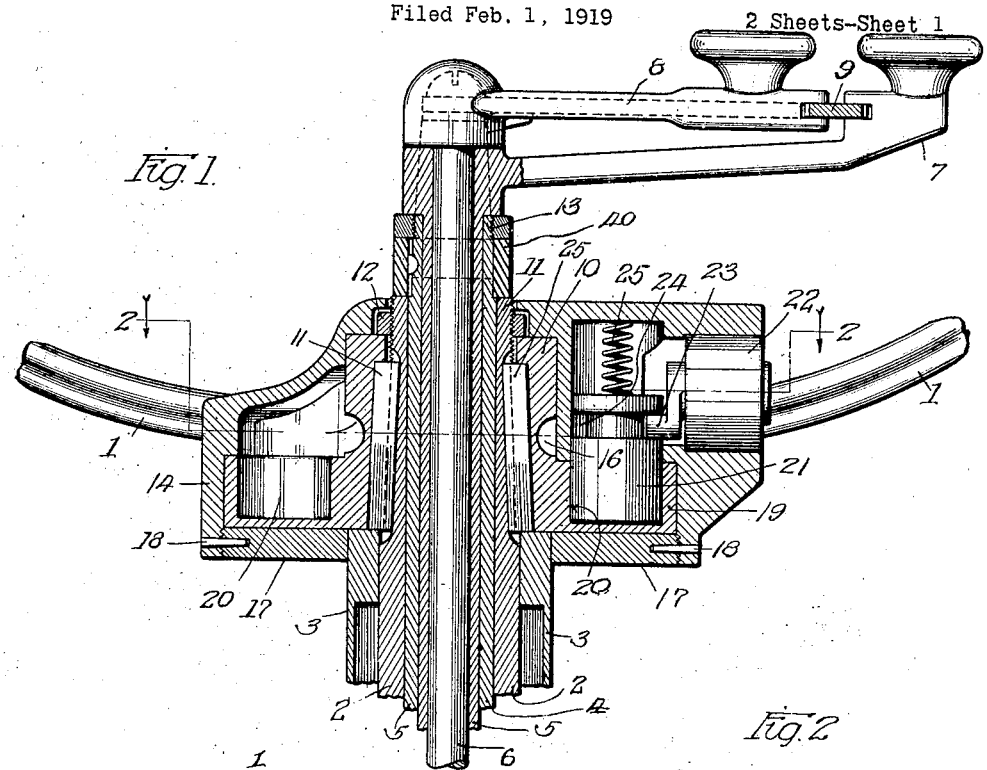
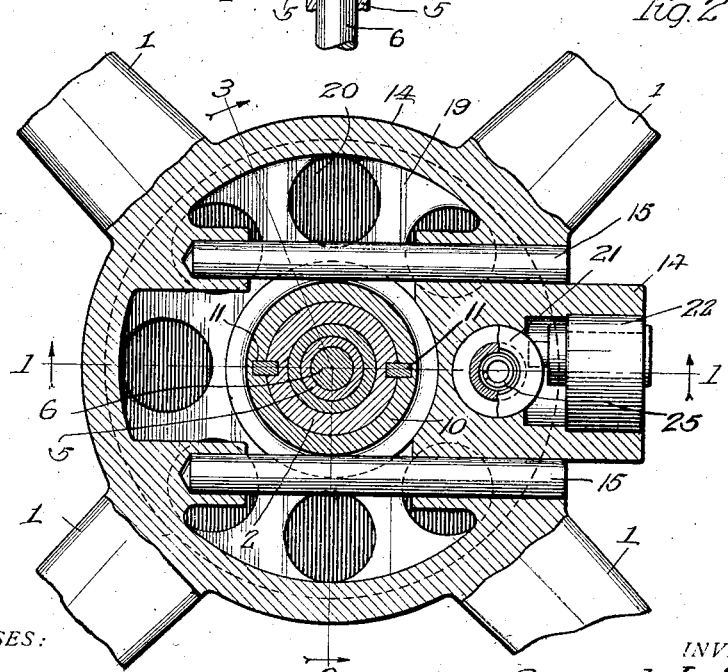
WITNESSES:
INVENTOR
Samuel L. Terry
BY
ATTORNEY

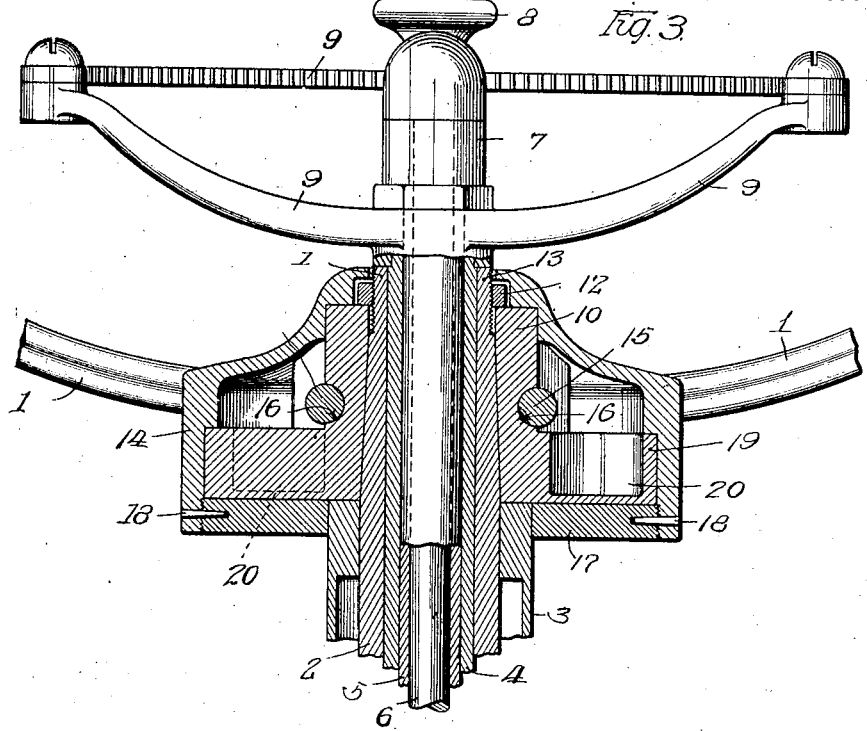
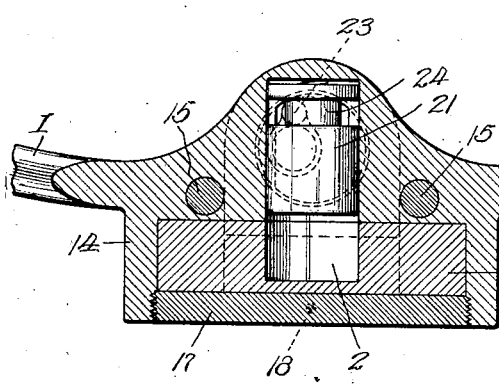
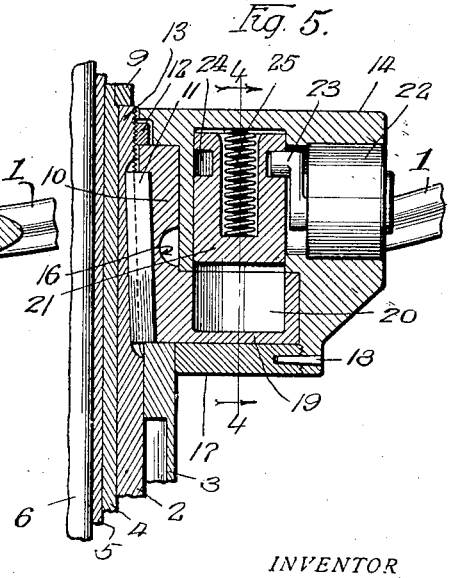

Patented Apr. 24, 1923.

1,453,115

UNITED STATES PATENT OFFICE.

SAMUEL L. TERRY, OF CHICAGO, ILLINOIS, ASSIGNOR, BY MESNE ASSIGNMENTS, TO TERRY-McCLUSKEY AUTO LOCK COMPANY, A CORPORATION OF ILLINOIS.

LOCK.

Application filed February 1, 1919. Serial No. 274,469.

*To all whom it may concern:*

Be it known that I, SAMUEL L. TERRY, a citizen of the United States, residing at Chicago, in the county of Cook and State of Illinois, have invented certain new and useful Improvements in Locks, of which the following is a specification.

This invention relates to locks.

It relates more particularly to automobile steering wheel locks.

The invention will be explained as embodied in a steering wheel of the type wherein the gas and spark control levers are above the wheel, although it is applicable to other types of steering wheels.

One of the objects of the invention is to provide an improved lock for protecting automobiles against theft.

Another object is to provide a steering wheel lock which may be readily installed but can not be readily removed after installation.

Another object is to provide a steering wheel lock wherein the locking mechanism is housed and protected against removal by the hub of the wheel.

Another object is to provide a steering wheel lock which is simple and relatively reliable and inexpensive.

Other objects and advantages will hereinafter appear.

An embodiment of the invention is illustrated in the accompanying drawings, wherein—

Fig. 1 is a central longitudinal section of the device taken on line 1—1 of Fig. 2 showing the wheel locked to the steering post.

Fig. 2 is a transverse section taken on line 2—2 of Fig. 1.

Fig. 3 is a section taken on line 3—3 of Fig. 2.

Fig. 4 is a section taken on line 4—4 of Fig. 5, and

Fig. 5 is a section, similar to the section shown in Fig. 1, and which shows the steering wheel unlocked or in a position relatively rotatable with reference to the steering post.

In all the views the same reference characters are employed to indicate similar parts.

The steering wheel chosen for illustration is of the type wherein unauthorized use of the automobile is prevented by allowing the steering wheel to be turned idly or inoperatively relative to the steering gear. Authorized use of the automobile is permitted by operatively associating the steering wheel and steering gear.

The automobile steering wheel 1 is adapted for mounting upon the top of the usual steering post or shaft 2. The outer rim of the wheel is not shown, but it may be of any approved type.

Post 2 is ordinarily housed within a stationary steering column 3. In automobiles wherein the gas and spark control levers are above the steering wheel, the steering post is usually in the form of a tube and surrounds a stationary tube 4. Passing through tube 4 and extending above post 2 are the gas and spark control rods 5 and 6. Gas rod 5 is shown in the form of a tube, and spark rod 6 in the form of a solid shaft. Gas control rod 5 carries a gas control or throttle lever 7 and spark control rod 6 carries a spark control lever 8. Levers 7 and 8 lie above the plane of the center of the steering wheel and cooperate with a quadrant 9 in the usual manner.

A journal-collar or journal-head 10, in the general form of a sleeve, is provided for relatively rigid attachment to post 2. The bore of head 10 and the upper end of post 2 may be correspondingly tapered to provide a tight fit therebetween. The head and post also may be keyed together by keys 11 to prevent relative rotation when they are properly assembled. A suitable holding device, such as a nut 12 adapted to be screwed upon the reduced and externally threaded upper end 13 of post 2, may be used to securely anchor or hold sleeve 10 and the assembled wheel upon the steering post.

The central portion of the steering wheel spider or hub 14 is made somewhat cup-shape to form a housing or casing for sleeve 10. The lower end of hub casing 14 is internally threaded. Sleeve 10 forms a journal-head upon which the steering wheel may be freely and idly turned without operating the steering post, as will be hereinafter described. Sleeve 10 and hub 14 are rotatably secured together but held against relative longitudinal movement by suitable means, such as pins 15. Pins 15 are insertable into suitable openings in hub 14 and lie in an annular or circumferential groove 16 in sleeve 10. A ring or washer like plate 17, whose periphery is threaded to enter the internally threaded lower end of hub 14, may also serve to assist in holding the steering wheel and sleeve 10 against relative longitudinal movement and to close the lower end of the hub. Pins 18 may be used to secure plate 17 in position after the same has been properly screwed into place in hub 14.

Sleeve or journal head 10 has an annular flange 19 which is provided with a series of circularly disposed sockets 20. Sockets 20 are adapted to receive a movable latch-bolt 21. Latch-bolt 21 is carried by the steering wheel. When latch-bolt 21 is moved into one of the sockets 20, the steering wheel is immovably locked to the sleeve and, consequently, to the steering post and steering gear.

The automobile is then in manageable condition because turning the steering wheel turns the steering gear and guiding wheels. When latch-bolt 21 is withdrawn from hub 10, the steering wheel is freed from the steering post and may be turned independently thereof. In this condition the automobile is unmanageable because the turning of the steering wheel does not turn the steering gear and the guiding wheels.

Latch-bolt 21 is slidably carried in a suitable recess in hub 14 and may be moved by suitable means such as an ordinary pin and tumbler key-actuated lock 22. The key actuates a crank arm 23. Crank arm 23 fits into an annular groove 24 in latch-bolt 21 so that the rotation of the key causes reciprocation of the latch-bolt in the usual manner. The latch-bolt may be biased to locking position relative to sockets 20 by a spring 25.

The steering wheel lock herein shown is installed as follows:

If the installation is to be made on an automobile already equipped with an ordinary wheel, the old wheel is first removed. Of course, for factory installation, the automobile may not have a wheel in place.

Plate 17 is slipped down over the top of the steering post. Journal head 10 is fitted upon the top of the steering post and the securing device therefor, such as nut 12, is applied. The steering wheel hub 14 is then set down upon the journal head, pins 15 are driven into place through the hub and groove 16 and plate 17 is raised and screwed and fastened in place in the bottom of the hub. If the automobile is of the type having the spark and gas control levers above the steering wheel, these appliances and the quadrant are applied in the usual way.

The automobile now may be rendered manageable by operating the lock, so that the latch-bolt is in one of the journal-head sockets. In order to render the automobile unmanageable, the lock is operated to raise the latch-bolt from the socket and thereby free the steering wheel.

The central portion or hub of the steering wheel provides a housing or casing which shields the nut or other means used for anchoring the wheel upon the steering post. The automobile and wheel lock are thereby protected. Of course, there need not be an opening through the top of the steering wheel hub, if the spark and gas control levers are below the wheel as in the Ford automobile.

The invention claimed is:

1. An automobile lock having a socketed head for attachment to the steering post of an automobile, a nut for anchoring the head on the post, a steering wheel having at its axis a housing which encloses and journals on the head and also prevents access to the nut, lock mechanism for operatively connecting and disconnecting the wheel and head, and means for preventing the removal of the housing from the head.

2. An automobile lock comprising a journal head adapted for operative association with the steering post of an automobile and providing a bearing for a steering wheel, a nut for preventing the removal of a head from the post, a steering wheel having a housing which encloses and is journaled upon the head and also prevents access to the nut, lock mechanism for operatively and inoperatively associating the head and wheel, and means for holding the steering wheel on the head.

3. An automobile lock comprising a journal head adapted for attachment to the steering post of an automobile and having sockets therein, a nut adapted to be screwed upon the steering post and acting to hold the head thereon, a steering wheel whose hub is journaled upon the head and forms a means for preventing access to the nut, and a manually controlled latch-bolt carried by the wheel and movable into and out of a socket in the head to operatively connect and to disconnect the wheel and head.

4. An automobile lock having a journal head for attachment to the steering post of an automobile; a nut for application to the post to hold the head thereon; a steering wheel having a housing which is installed by setting the same down over the head and whose top is closed sufficiently to prevent access to the nut, lock mechanism for operatively and inoperatively associating the wheel and post, and means for preventing the removal of the wheel from the head.

5. The combination of a steering shaft having its upper end provided with a reduced extension and a projecting threaded stud, a journal-collar mounted on said reduced extension and provided with a bolt-socket and with a circumferential groove, a nut securing said journal-collar to said shaft, a steering-wheel having a spider provided with a hub mounted on said journal-collar and protecting said nut, a pin in said hub engaging said circumferential groove, and a lock mounted in said spider and equipped with a bolt adapted to engage said socket.

6. The combination of a steering shaft, provided with a threaded extremity, a journal collar fitted on said shaft, a nut securing said collar in position, a steering-wheel having a spider provided with a hub journaled on said journal-collar and protecting said nut, means securing said hub rotatively on said journal-collar, a bolt-chamber and a lock-casing chamber formed integrally with said spider, a reciprocable bolt mounted in the bolt chamber, a lock-casing mounted in the lock-casing chamber, and a key-actuated member mounted in said lock-casing and adapted to reciprocate said bolt.

In testimony whereof I hereunto subscribed my name.

SAMUEL L. TERRY.